United States Patent
Volan

(10) Patent No.: US 8,225,957 B1
(45) Date of Patent: *Jul. 24, 2012

(54) METHOD FOR MANUFACTURING A THERMALLY INSULATED DRINKING GLASS OR GLASS BOTTLE

(76) Inventor: Ken M. Volan, Parma, OH (US)

( * ) Notice: Subject to any disclaimer, the term of this patent is extended or adjusted under 35 U.S.C. 154(b) by 1926 days.

This patent is subject to a terminal disclaimer.

(21) Appl. No.: 10/619,356

(22) Filed: Jul. 14, 2003

Related U.S. Application Data

(63) Continuation of application No. 10/172,129, filed on Jun. 14, 2002, now Pat. No. 6,629,618.

(51) Int. Cl.
*A47J 41/00* (2006.01)

(52) U.S. Cl. .............. 220/592.23; 220/592.17; 220/500; 215/12.1

(58) Field of Classification Search ................. 215/12.1, 215/13.1; 220/500, 506, 592.16, 592.17, 220/592.23, 592.24, 614, 806, 592.15
See application file for complete search history.

(56) References Cited

U.S. PATENT DOCUMENTS

| | | | | |
|---|---|---|---|---|
| 3,734,394 | A * | 5/1973 | Dooley | 383/109 |
| 5,894,948 | A * | 4/1999 | Yeh | 215/12.1 |
| 6,155,452 | A * | 12/2000 | Laurent | 220/739 |
| 6,308,846 | B1 * | 10/2001 | Muller | 215/13.1 |
| 2002/0027139 | A1 * | 3/2002 | O'Neill | 220/254 |
| 2004/0081775 | A1 * | 4/2004 | Martin et al. | 428/34 |

FOREIGN PATENT DOCUMENTS

WO    WO 9804477 A1 * 2/1998

* cited by examiner

*Primary Examiner* — Harry Grosso
(74) *Attorney, Agent, or Firm* — John D. Gugliotta, Esq

(57) ABSTRACT

A thermally insulated glass and/or bottle is provided as an insulated glass and/or bottle made from glass with an interstitial space in the sides and bottom. The sides and bottom of the glass are double-walled, forming an interstitial space for insulating purposes. The interstitial space can be left filled with air, or filled with an insulating material such as STYROFOAM®. The interstitial space not only reduces or eliminates condensation from forming on the exterior of the glass when filled with cold liquid on hot, humid days, but it also helps keep the liquid cooler.

10 Claims, 4 Drawing Sheets

METHOD FOR MANUFACTURING A THERMALLY INSULATED DRINKING GLASS OR GLASS BOTTLE

RELATED APPLICATIONS

The present invention in a Continuation in Part of U.S. application Ser. No. 10/172,129, filed on Jun. 14, 2002 now U.S. Pat. No. 6,629,618 and allowed, but not yet issued, which was a Continuation in Part of U.S. Pat. No. 6,405,892 issued on Jun. 18, 2002, the disclosures of which is fully incorporated herein as if fully rewritten.

BACKGROUND OF THE INVENTION

1. Field of the Invention

The present invention relates generally to insulated drinking containers and, more particularly, to a thermally insulated beverage glass and/or bottle.

2. Description of the Related Art

Nothing is more refreshing on a hot day than a cold beverage such as ice tea, soda, beer, ice water or the like. However, one must deal with the "sweating" or condensation that forms on the exterior of a glass and/or bottle. This sweating may leave puddles or water rings on the table, which may cause damage if the table is made of wood. The condensation also causes a safety problem should the glass or bottle slip from ones hand when picking it up. One method of reducing such problems is the use of insulated plastic glasses and bottles. While plastic glasses and bottles with insulating walls do cut down on condensation on the exterior of the glass or bottle, many people do not like plastic, due to its cheaper feel, and thus, such plastic glasses and/or bottles would not be used in finer restaurants.

Accordingly, a need has developed for glasses and bottles made from glass, so that cold beverages can be enjoyed without glass condensation problems. The development of the thermally insulated beverage glass or bottle fulfills this need.

Several attempts have been made to overcome these problems, including those shown in:

U.S. patent No. based upon Ser. No. 10/172,129; and
U.S. Pat. No. 6,405,892 issued on Jun. 18, 2002;
the disclosures of which in fully incorporated herein as if fully rewritten.

However, additional development has indicated a number of improvement to the method of manufacturing such a thermally insulated beverage glass or bottle.

Consequently, a need has been felt for providing an improved method of making a thermally insulated glass or bottle manufactured from glass.

SUMMARY OF THE INVENTION

Therefore, it is an object of the present invention to provide an improved method for making a drinking glass or glass bottle which is great for cold beverages such as beer, soda, tea, water and the like.

It is another object of the present invention to provide an improved method for making a drinking glass or glass bottle which eliminates or reduces condensation on the outside of the glass.

It is still another object of the present invention to provide an improved method for making a drinking glass or glass bottle with double walls which provides an insulating, interstitial space.

It is still another object of the present invention to provide an improved method for making a drinking glass or glass bottle with double walls which keeps the outer wall at a warmer temperature so as to keep the glass from sweating.

It is another object of the present invention to provide a drinking glass or glass bottle with double walls which keeps beverages colder or warmer.

It is another object of the present invention to provide a drinking glass or glass bottle with double walls which prevents one's hands from warming the beverage as well.

It is another object of the present invention to provide an interstitial space which can be left filled with air, thus forming a vacuum therein.

It is another object of the present invention to provide an interstitial space which can be filled with decorative insulating material as well for aesthetic qualities.

It is another object of the present invention to provide a smooth rim which presents no danger to the user.

Briefly described according to one embodiment of the present invention, a thermally insulated drinking glass or beverage bottle is an insulated glass container made from glass or bottle with an interstitial space in the sides and bottom. The sides and bottom of the bottle are double-walled, forming an interstitial space for insulating purposes. The interstitial space can be left filled with air, or filled with an insulating material such as STYROFOAM®. Other decorative insulating materials can be placed in the interstitial space as well. An optional hemispherical member, located on the bottom of the inner side wall of the glass or bottle, is used to increase structural integrity of the glass or bottle. The interstitial space not only reduces or eliminates condensation from forming on the exterior of the glass or bottle when filled with cold liquid on hot, humid days, but it also helps keep the liquid cooler.

The use of the present invention provides a means to enjoy a cold beverage without the aggravations and disadvantages of condensation or sweating.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

In order to describe the complete relationship of the invention, it is essential that some description be given to the manner and practice of functional utility and description of the thermally insulated drinking glass or glass bottles upon which the present invention attempts to improve. As described in U.S. application Ser. No. 10/172,129 and U.S. Pat. No. 6,405,892, a thermally insulated glass bottle or drinking glass is provided having a generally tubular inner glass wall which forms male connection threads along the circumferential sidewall. Whether a rim is provided being tapered out to form a drinking lip (for a drinking glass) or a neck is provided tapered upward and inward to form a bottle opening, either of these inner members are threadingly engage to an outer sidewall. The vertical circumferential sidewall is inwardly offset relative to the outer sidewall so as to insertably engage within the outer glass wall along most of the vertical height. The inner sidewall includes a circular bottom wall. In the event that additional vertical support is required for the tubular inner glass wall it is envisioned that the lower circular bottom support wall optionally includes an upwardly extending, integral support member for providing structural integrity to the bottom wall and thereby the inner sidewall as well.

Without repeating this existing technology in total, the best mode for carrying out the invention is presented in terms of changes to this technology herein depicted within the Figures.

1. Detailed Description of the Figures

Figure 1:
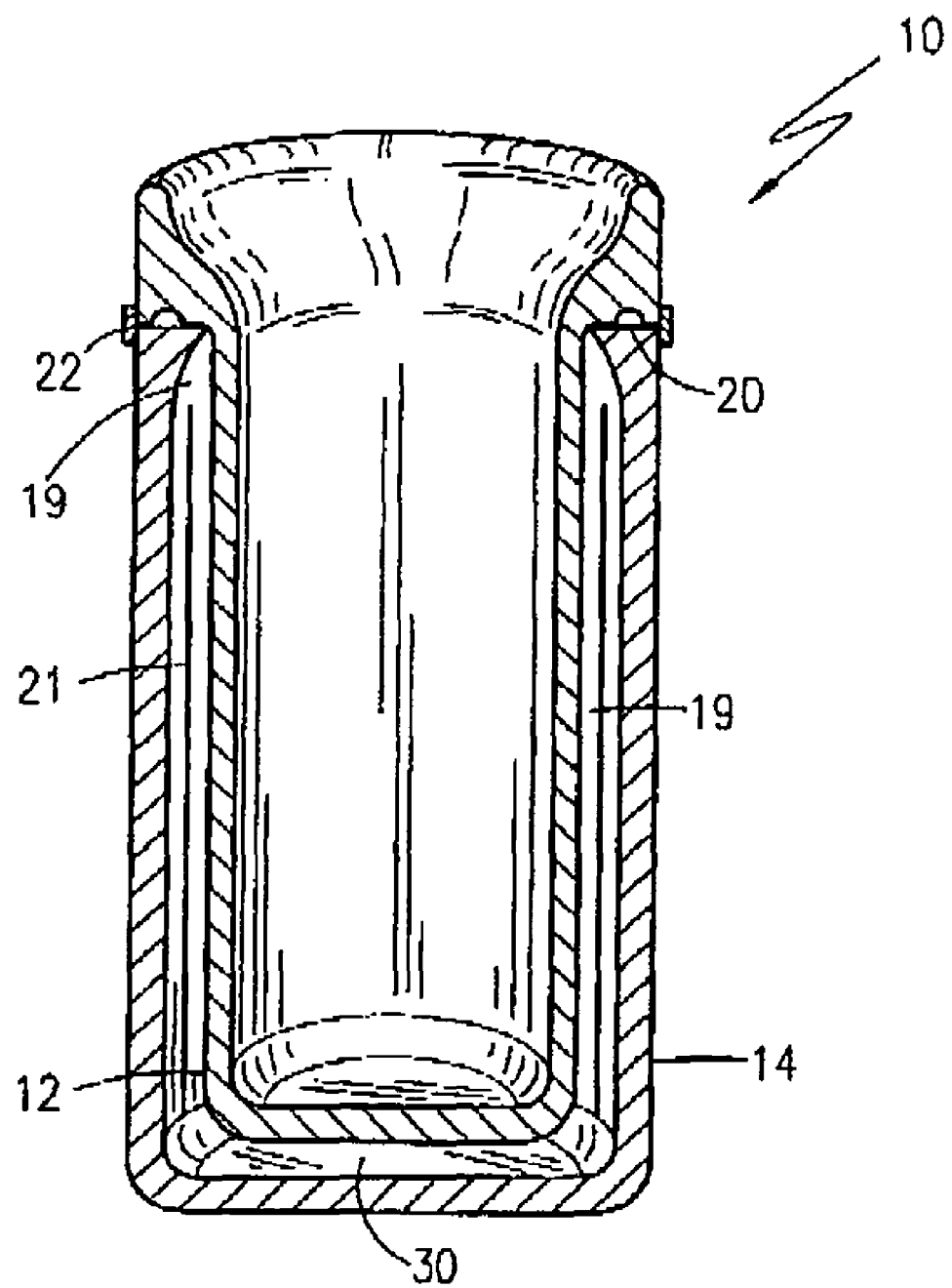
FIG. 1 is a side elevational cross sectional view of a thermally insulated drinking glass according to the preferred embodiment of the present invention.
Figure 2:
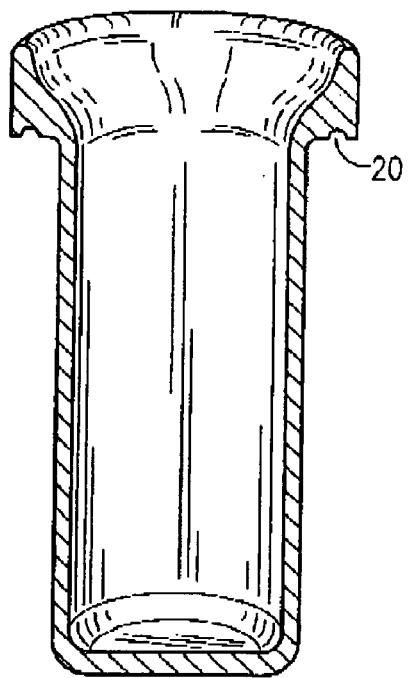
FIG. 2 is a side elevational view of an inner drinking glass member.
Figure 3:
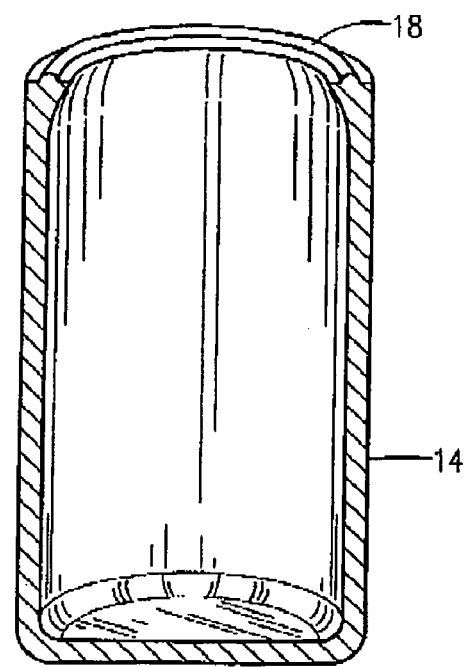
FIG. 3 is a side elevational view of an outer drinking glass wall.
Figure 4:
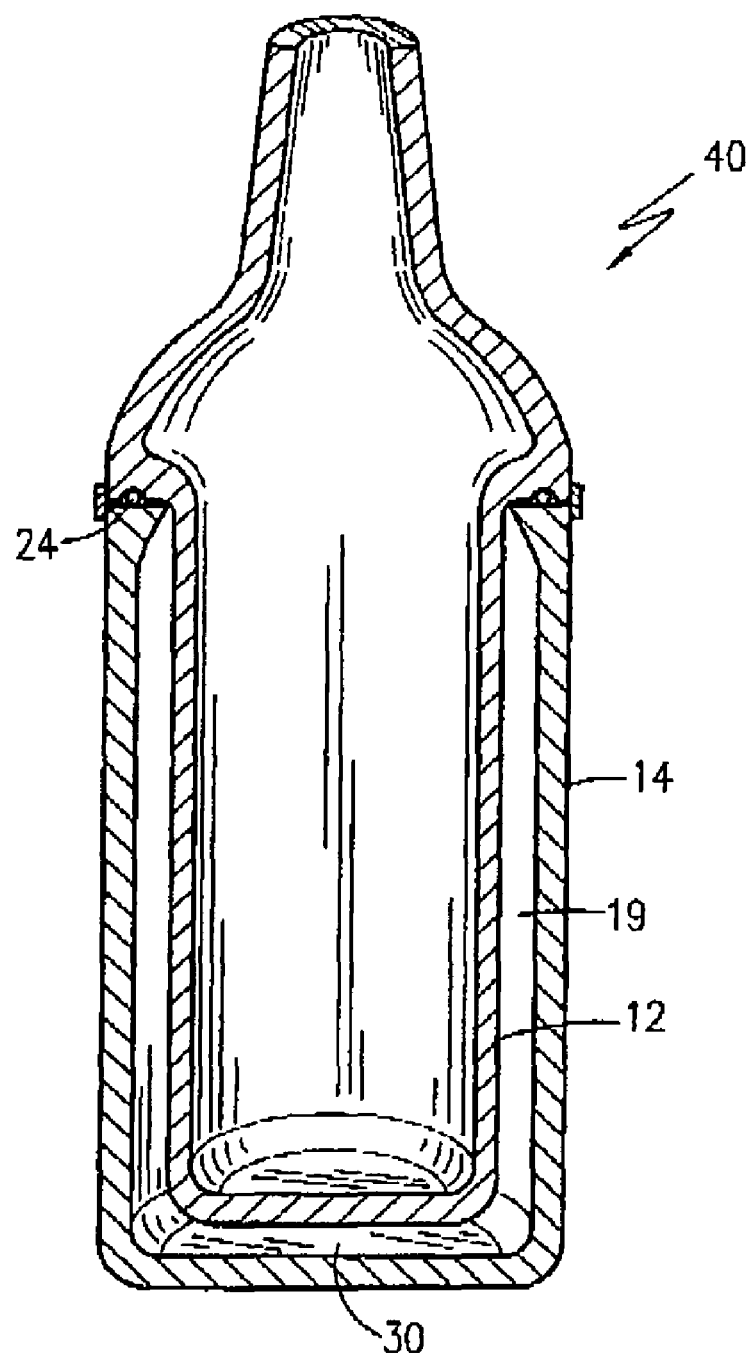
FIG. 4 is a side elevational cross sectional view of a thermally insulated glass bottle according to an alternate embodiment of the present invention.
Figure 5:
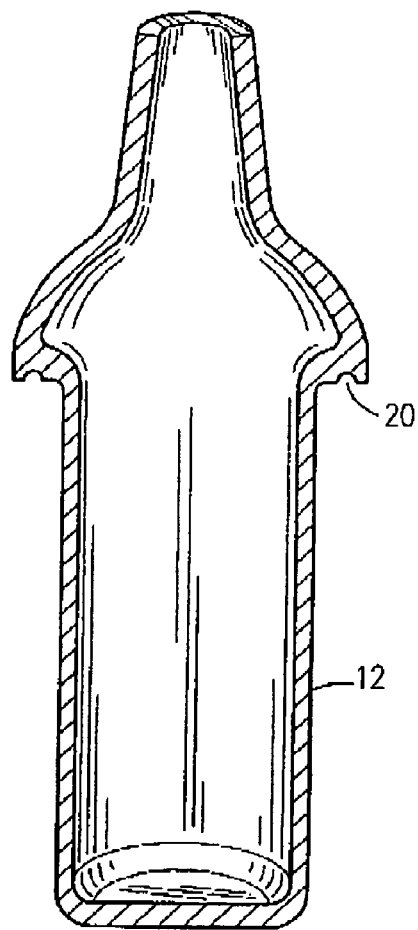
FIG. 5 is a side elevational view of an inner bottle member.
Figure 6:
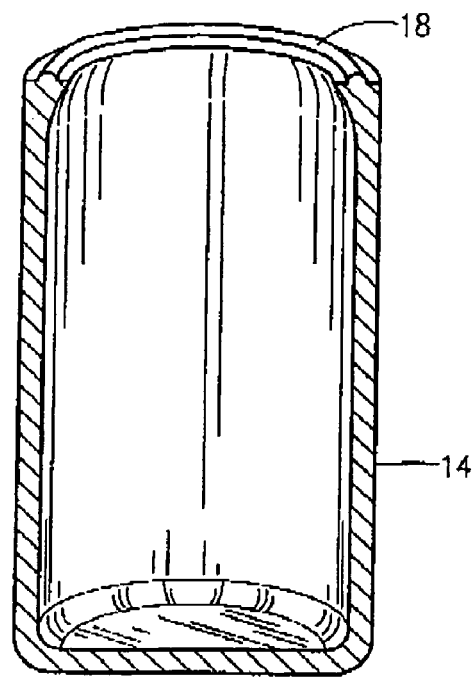
FIG. 6 is a side elevational view of an outer bottle wall.

Referring now to FIGS. 1-3, a thermally insulated drinking glass 10 is shown, according to the preferred embodiment of the present invention. Further, FIGS. 4-6 show a thermally insulated glass bottle 40 of an alternate embodiment of the present invention. In either case, however, the threads are removed on both the tubular inner glass wall 12 and the outer sidewall 14, and a special adhesive will be used to join and seal the inner and outer glass walls. The adhesive point can be at the point where the class seats into the sealing member, i.e., the base 30 of the glass 10. The sealing of the inner and outer walls creates an interstitial space 19. It is possible to place a decorative insulating material 21 within the interstitial space. It is envisioned at this time that such an adhesive would be a UV curable adhesive that is clear or transparent when fully cured, similar to Product #3491 from Loctite Corp or an equivalent in the art. Such an adhesive is a Light Cure Acrylic, which is clear in color and used specifically for bonding glass. It is cured under a high intensity ultra violet lamp.

Alternately, a secondary adhesive that is envisioned is Locktite Corp. product #E-30CL, which is a clear epoxy adhesive for bonding glass. It is possible that a special adhesive could be designed with some of the same properties and characteristics as both or either of these adhesives specifically designed for the thermally insulated glass or bottle.

Yet another adhesive that is anticipated as being acceptable is a thermoplastic polyurethane resin, such as Deerfield Polyurethane A3600, Deerfield Polyurethane A4100 or A4700, which is cured by the application of heat and pressure. The use of thermoplastic polyurethane provides an added feature and advantage of permitting reuse and recycling of the material beyond the life of the glass and/or bottle. In any event, it is anticipated that any adhesive needs to be "food grade safe" due to the nature of the present application.

Independent of the exact type of adhesive, a groove 20 is formed from the glass and/or bottle mold where the inner and outer glass walls join to created a channel for the adhesive to "rest" in place before it is cured. This groove 20 may be either and/or in both the inner and outer walls. It if further envisioned that an annular gasket 24 is placed within the groove for properly fitting the walls together while accounting for tolerances in the glass when fabricated, and to prevent intrusion of liquid between the walls. In one embodiment, the groove 20 is positioned a vertical distance from the top lip of the glass 10 so that there is no contact between the mouth of the user and the groove 20. This positioning is envisioned as preventing bacterial or microbial contact between the user's mouth and any bacteria or microbes that may accumulate in the groove 20, in which the bacteria or microbes may have escaped cleaning from either hand washing or mechanized machine dish washing. In another embodiment, the groove 20 is positioned near the top lip of the glass 10, but is circumscribed by a sheath 22, thereby preventing the accumulation of bacteria and/or microbes from food or other sources. The sheath 22 is envisioned as being fabricated from a variety of materials, including metal, laminates and a variety of films. The sheath 22 is envisioned as being melted onto and over the groove 20. The sheath 22 is envisioned as having a decorative appearance, as well, including a variety of solid colors, multicolors and other decorative indicia.

2. Operation of the Preferred Embodiment

To use the present invention, the user simply pours a desired beverage within the hollow interior and drinks from the neck or rim of the present invention like any other glass or bottle. The interstitial space serves to insulate the beverage from the outer sidewall of the glass bottle thus preventing condensation from forming thereon. The resulting functionality of the interstitial space serves not only to keep beverages colder and to prevent a user's hands from warming the beverage, but also prevents slippage of the glass and/or bottle from the user's hands.

The use of the present invention provides a means to enjoy a cold beverage without the aggravations and disadvantages of condensation or sweating.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A thermally insulated glass beverage vessel comprising:
    a generally tubular inner member formed of glass and having a first inner sidewall and having a first outer sidewall integrally forming a bottom support wall, said first outer sidewall being a substantially vertical annular outer sidewall forming a generally horizontally disposed first connection surface along an upper portion;
    said inner sidewall forming a hollow interior designed to receive beverages;
    a generally tubular outer member formed of glass and having a second inner sidewall terminating at an upper peripheral rim in a generally horizontally disposed second connection surface;
    a groove comprised on one of said first or said second connection surfaces; and,
    an adhesive;
    said first connection surface and said second connection surface are joined via said adhesive so as to form an interstitial space between said first outer sidewall and said second inner sidewall such as to thermally insulates the first inner sidewall along both the bottom wall and circumferential sidewalls thereof; and
    a sealing member placed within said interstitial space wherein said sealing member is formed of a clear pliable material.

2. The thermally insulated glass beverage vessel of claim 1, wherein said adhesive is food grade safe.

3. The thermally insulated glass beverage vessel of claim 1, wherein said adhesive is a UV curable adhesive that is clear or transparent when fully cured.

4. The thermally insulated glass beverage vessel of claim 1, wherein an annular gasket is placed within said groove to prevent intrusion of liquid between said outer sidewall and said inner sidewall, said gasket further providing for a seal to account for tolerance in said outer wall and said inner wall during fabrication.

5. The thermally insulated glass beverage vessel of claim 1, wherein said groove is positioned a vertical distance downward from a top lip of said beverage vessel, said distance to prevent contact between a user's mouth and said groove.

6. The thermally insulated glass beverage vessel of claim 5, wherein said groove is circumscribed by a protective sheath, thereby preventing bacterial accumulation.

7. A thermally insulated glass beverage vessel comprising:
a generally tubular inner member formed of glass, said inner member having a first inner sidewall and a first outer sidewall and integrally forming a bottom support wall, said first outer sidewall forming a generally horizontally disposed first seal engagement surface;
a generally tubular outer member formed of glass, said outer member having a second inner sidewall and a second outer sidewall and integrally forming a base, said second inner sidewall forming a generally horizontally disposed second seal engagement surface about a peripheral rim;
said first inner sidewall forming a hollow interior designed to receive beverage;
said first outer sidewall being inwardly offset relative to said first seal engagement surface;
said tubular outer member adapted to receive said tubular inner member such as to form a space between said first outer sidewall and said first inner sidewall; and
a sealing member designed to sealingly engage between said first seal engagement surface and said second seal engagement surface, wherein said scaling member is further secured via an adhesive, wherein said scaling member is formed of a clear pliable material.

8. The thermally insulated glass beverage vessel of claim 7, wherein said adhesive is food grade safe.

9. The thermally insulated glass beverage vessel of claim 7, wherein said adhesive is a UV curable adhesive that is clear or transparent when fully cured.

10. The thermally insulated glass beverage vessel of claim 7, wherein said tubular outer member and said tubular inner member are further secured at said base via an adhesive.

\* \* \* \* \*